US006917739B2

(12) United States Patent
Chen (10) Patent No.: US 6,917,739 B2
(45) Date of Patent: Jul. 12, 2005

(54) OPTICAL CACHE MEMORY

(75) Inventor: Datong Chen, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 23 days.

(21) Appl. No.: 10/401,827

(22) Filed: Mar. 27, 2003

(65) Prior Publication Data

US 2004/0190845 A1 Sep. 30, 2004

(51) Int. Cl.[7] ................................................ G02B 6/42
(52) U.S. Cl. ........................ 385/122; 385/15; 359/108
(58) Field of Search ............................ 385/122, 15, 14, 385/37, 27; 359/108

(56) References Cited

U.S. PATENT DOCUMENTS

| | | | |
|---|---|---|---|
| 4,815,804 A | | 3/1989 | Desurvire et al. |
| 5,058,060 A | | 10/1991 | Su |
| 5,740,117 A | * | 4/1998 | Bona et al. .................. 365/215 |
| RE37,561 E | | 2/2002 | Li |
| 6,647,163 B2 | * | 11/2003 | Song ............................ 385/15 |
| 6,714,697 B2 | * | 3/2004 | Fukashiro et al. ............ 385/16 |
| 2002/0012492 A1 | * | 1/2002 | Takahashi et al. | |

FOREIGN PATENT DOCUMENTS

| | | |
|---|---|---|
| EP | 0 411 562 B1 | 2/1995 |
| EP | 0 458 704 B1 | 10/1996 |
| EP | 0 883 322 B1 | 7/2000 |
| JP | 03083292 | 4/1991 |
| WO | WO 98/44512 | 10/1998 |

OTHER PUBLICATIONS

Langenhorst, R. et al., "Fiber Loop Optical Buffer", Jounral of Lightwave Technology, vol. 14, No. 3, Mar. 1996, pp. 324–335.

Jacob, J. et al., "Photonic Access System based on Wavelength Domain Techniques for ATM Gigabit Switching Applications", Proceedings of the Intl Conference on Communications, May 23–26, 1993, vol. 3, pp. 1231–1235.

Schroder, S. et al., "Contention Resolution of High–Speed WDM Packets using a Dynamically Controlled Multiple––Wavelength Fiber Loop Buffer and Wavelength SHifting", CLEO 1997, May 18–23, 1997, pp. 494–495.

* cited by examiner

*Primary Examiner*—John R. Lee
*Assistant Examiner*—Zia R. Hashmi (57) ABSTRACT

An optical memory having an input port for receiving an input optical signal to be stored in the optical memory is disclosed. A portion of the optical signal is coupled to a storage loop for storing optical signals by a coupler that transfers a portion of the input optical signal to the storage loop. An optical signal stored in the storage loop is output by coupling a portion of that optical signal to a first external optical waveguide. The storage loop includes a semiconductor optical amplifier for amplifying the signals stored in the storage loop to compensate for losses incurred by those signals in traversing the storage loop. A plurality of such optical memories can be combined to form a larger memory that includes a reconditioning circuit that resets the amplitude of the optical signals to a value that depends on the amplitude of the optical signals.

15 Claims, 7 Drawing Sheets

FIGURE 7

OPTICAL CACHE MEMORY

FIELD OF THE INVENTION

The present invention relates to storage systems for optical data.

BACKGROUND OF THE INVENTION

To simplify the following discussion, the present invention will be explained utilizing optically-based communication systems. However, the present invention can also be utilized in a wide range of other applications as will be discussed in more detail below.

The ever-increasing bandwidth requirements of communication systems have resulted in data being transmitted over optical fibers. Both conventional telecommunications and data networks such as the Internet utilize optical fibers for long distance transmission. Data is sent by breaking the transmission into data packets that are routed between the sender and receiver with the aid of switches that route packets between fibers and/or channels within a single fiber.

While the transmission of the data is performed optically, the switching of the data must often be performed by converting the optical signals to electrical signals. The electrically-based data packets are then re-arranged using an electrically-based cross-connect switch. The re-arranged electrically-based packets are then converted back to optical signals. The electrically-based switches typically switch packets between a plurality of input channels and a plurality of output channels. Data from each input channel is stored in a cache memory. The data packets for each output channel are then assembled by reading the data stored in the cache memory.

While optical communication channels provide data rates in excess of 10 Gbits/sec at relatively modest costs, electrically based circuitry that can operate at these high data rates are either non-existent or very expensive. For example, the electrically based packet switches discussed above must utilize a highly parallel architecture to make up for the relatively slow operating speed of the memories and data routing circuitry to obtain the needed throughput. Such circuitry is complex and costly.

SUMMARY OF THE INVENTION

The present invention includes an optical memory having an input port for receiving an input optical signal to be stored in the optical memory. A portion of the optical signal is coupled to a storage loop for storing optical signals by a coupler that transfers a portion of the input optical signal to the storage loop. An optical signal stored in the storage loop is output by coupling a portion of that optical signal to a first external optical waveguide. The storage loop includes a semiconductor optical amplifier for amplifying the signals stored in the storage loop to compensate for losses incurred by those signals in traversing the storage loop. In one embodiment, the input port includes an input optical switch for connecting and disconnecting the storage loop from a second external optical waveguide. In another embodiment, the storage loop includes an optical switch for selectively blocking one of the optical signals stored in the storage loop from propagating in the storage loop. The optical switches are preferably operated by a controller that monitors the storage loop and the input and output ports. A plurality of such optical memories can be combined to form a larger memory that includes a reconditioning circuit that resets the amplitude of the optical signals to a value that depends on the amplitude of the optical signals.

DETAILED DESCRIPTION OF THE PREFERRED EMBODIMENTS OF THE INVENTION

The present invention avoids the costly circuitry discussed above by providing an optically based cache for storing optical data packets. The manner in which the present invention stores an optical signal can be more easily understood with reference to FIG. 1, which is a schematic drawing of an optical cache memory 10 according to one embodiment of the present invention. Optical cache memory 10 stores and retrieves optical packets in the form of a modulated optical signal that specifies a plurality of bits of data. Any appropriate form of optical modulation can be utilized including amplitude modulation, phase modulation, and polarization modulation. An optical packet that is to be stored in optical cache memory 10 is input to optical cache memory 10 on optical fiber 22 through optical switch 12. A portion of the light traversing optical fiber 11 is diverted into storage loop 13 by coupler 14. Each time the optical packet traverses storage loop 13, a portion of the circulating signal is coupled back to optical fiber 11 by coupler 14 and the remainder of the signal re-circulates in storage loop 13. The portion of the optical signal that is coupled back into optical fiber 11 can be output via optical switch 16 onto output fiber 17. When optical switch 16 is closed, it absorbs the portion of the stored optical signal that enters the switch. A controller 20 controls the various optical switches.

Optical switches are known to the art, and hence, will not be discussed in detail here. For the purposes of the present discussion, it is sufficient to note that an optical switch can be constructed in a manner similar to an edge-emitting laser. Both the laser and modulator are constructed by depositing a number of layers on a suitable substrate. The bottom layers typically include an n-type contact layer and a cladding layer. An active region is grown on top of the cladding layer. The active layer may include one or more strained quantum well layers separated by barrier layers. A confinement layer is typically deposited on each side of the active region. A p-type cladding layer and a p-type contact layer are deposited on the active region. A light modulator or switch is based on the observation that the quantum well structures will absorb light below a cutoff wavelength whose value depends on the potential across the quantum well layers. The position of the cutoff wavelength is determined by the composition of the quantum well layers. To provide the desired switching function, this cutoff wavelength must move from a value below the wavelength of the light signal being switched to a value above the wavelength of the light signal being switched when the potential across the modulator layers is switched.

Figure 1:
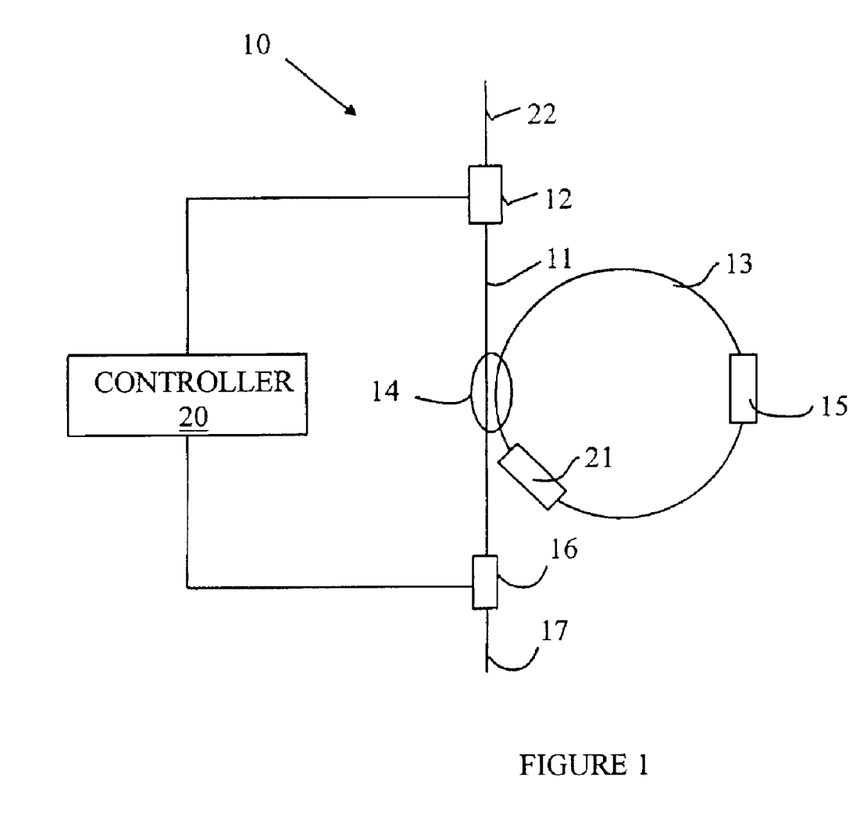
FIG. 1 is a schematic drawing of one embodiment of an optical cache memory according to the present invention.

As noted above, each time the stored packet traverses storage loop 13 a portion of the optical signal leaves storage loop 13, and hence, is lost. Hence, in the absence of some form of amplifier, the signal in storage loop 13 would quickly fade. The required amplification is provided by semiconductor optical amplifier 15 which has a gain that is set to just make up the losses resulting from absorption in the optical fiber and the amplitude that is lost due to coupler 14. Semiconductor optical amplifiers are also known to the art, and hence, will not be discussed in detail here. For the purposes of the present discussion, it is sufficient to note that a semiconductor optical amplifier can be constructed from a structure similar to that of an edge-emitting laser. However, the active region of a semiconductor optical amplifier may be constructed from a bulk material rather than the strained quantum well structure utilized in such lasers. It should also be noted that the gain of a semiconductor optical amplifier depends on the intensity of the light being amplified. As the intensity increases, the gain decreases. This gain effect provides a stabilization mechanism to guarantee that the light signal will not grow rapidly if the gain is set slightly higher than needed to make up for the intensity losses incurred by a light signal traversing the storage ring 13 and coupler 14.

Since the optical switches have the same basic structure as an optical amplifier when the switch is biased to transmit light, these switches can also provide gain as well as a switching function. Hence, the output switch may include sufficient gain to account for any losses in the coupler suffered by the light signal as it exits the storage ring. For example, consider a case in which coupler 14 splits the light signal evenly between storage ring 13 and output port 16. Also assume that the losses in the storage ring are small. In this case, both semiconductor optical amplifier 15 and output switch 16 would be designed to have a gain of 2.

The number of bits that can be stored in storage loop 13 at any time depends on the length of the optical fiber used to construct storage loop 13 and the modulation frequency, i.e., the bit rate, used to create the data packet. For example, at a data rate of 10 Gbits/sec, a 50-ft storage loop can accommodate approximately 750 bits. A storage loop of this size can be constructed by winding a conventional optical fiber on a cylindrical form or by utilizing lithographic techniques to form a wound fiber loop on a cylindrical substrate. For example, co-pending patent application Ser. No. 10/219,968 filed Aug. 14, 2002 discloses a method for fabricating a wave guide on the surface of a cylindrical substrate in which 10 meters of wave guide can be accommodated on a cylindrical substrate that is 1 cm in diameter and 5 cm in length.

In one preferred embodiment of the invention, the length of storage loop 13 is chosen such that storage loop 13 will hold a plurality of optical bits. In principle, an optical cache memory according to the present invention could be constructed with a storage loop that held only one bit of optical data. However, such a storage loop would be of limited value in constructing cache memories for use in communication systems in which the data is divided into packets of a larger size. As will be explained in more detail below, an optical cache memory for use in constructing a packet switch preferably holds at least one data packet. In general, a cache memory having a storage loop that holds more than one data packet will cost less than a cache memory with a storage loop that holds only one packet, since the extra storage capacity requires only that a longer storage loop be employed. Optical fiber is relatively inexpensive compared to high-speed optical switches and semiconductor optical amplifiers, and hence, the cost per bit stored decreases with the size of storage loop 13.

The maximum size of storage loop 13 is determined by the maximum delay that can be tolerated in retrieving a data packet. Any given data packet is only available for output when that data packet traverses optical coupler 14; hence, the maximum delay that can be incurred in reading a data packet is the transmission time required for an optical signal to traverse the full length of optical storage loop 13. Accordingly, there is a tradeoff between the maximum data latency and the size of storage loop 13.

Figure 2:
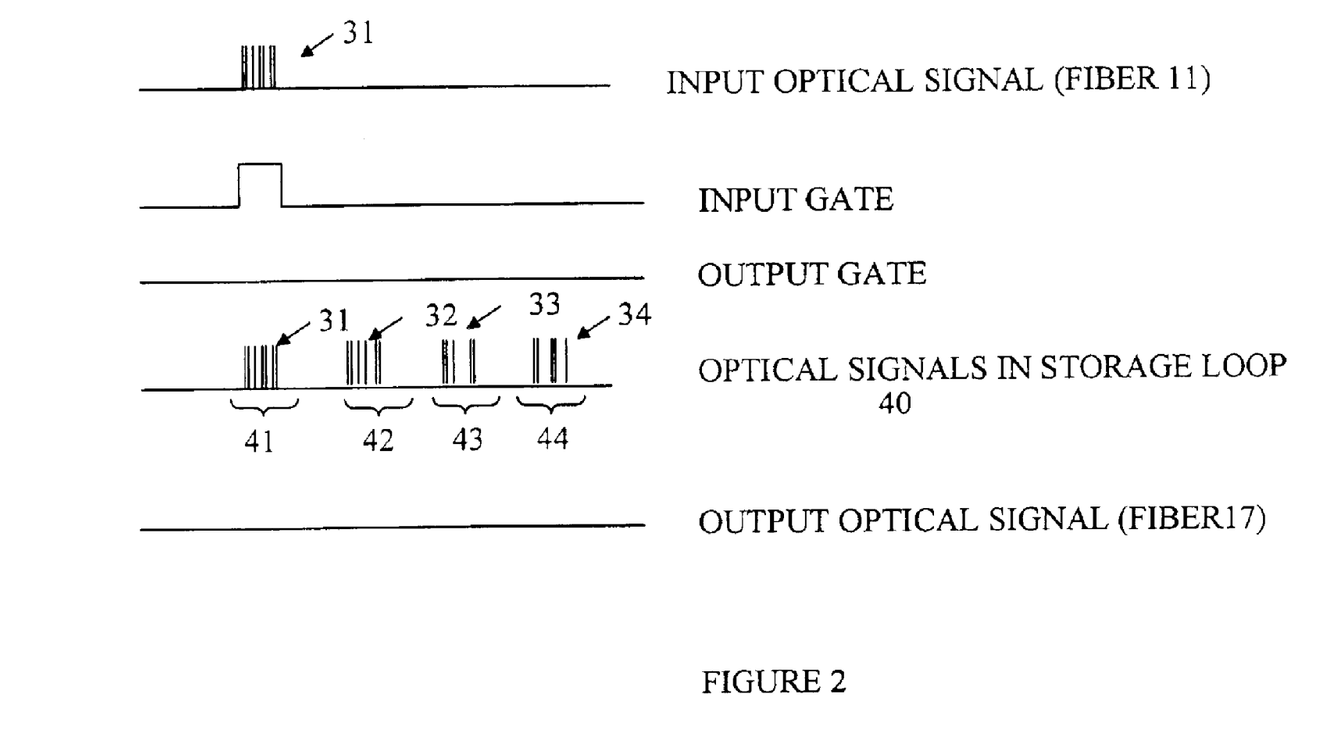
FIG. 2 illustrates the various signals during the introduction of an optical data packet 31 on optical fiber 11 into storage loop 13.

An optical cache memory according to the present invention can be used to store a single data packet or multiple data packets. Refer now to FIG. 2, which illustrates the various signals during the introduction of an optical data packet 31 on optical fiber 11 into storage loop 13 while storage loop 13 is currently storing a number of other data packets shown at 32–34. If one were to view the light intensity in storage loop 13 at coupler 14 as a function of time, the graph shown at 40 would be obtained. The storage capacity of storage loop 13 can be viewed as being divided into a plurality of time slots 41–44. In general, the time slots must include a buffer region at the beginning and end of the time slot to provide time for the various optical switches to open and close during storage and retrieval operations.

The introduction of data packet 13 must be timed such that there is a free slot at coupler 14 when the data packet arrives at input switch 12. If this is the first data packet to be placed in the storage loop, there will always be such a slot. In general, controller 20 keeps track of the positions of each of the stored data packets in storage loop 13 and signals the source of the new data packet when it is safe to transmit the new data packet. If the arrival of the new data packet must be delayed, a dedicated cache memory according to the present invention can also be used to provide that data delay. Controller 20 then opens switch 12 to allow the data packet to enter storage loop 13.

Figure 3:
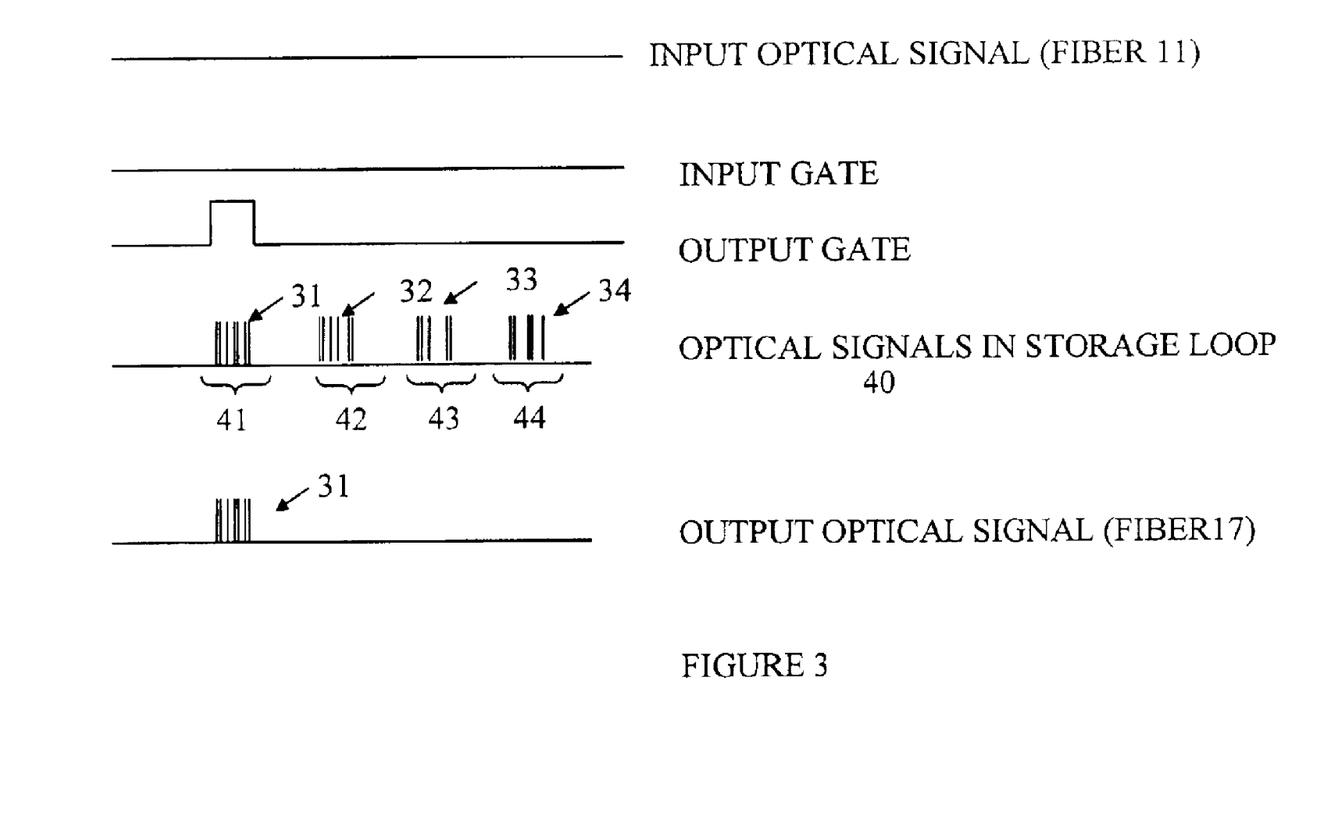
FIG. 3 illustrates the various signals during the extraction of data packet 31 from storage loop 13.

An optical data packet is extracted from storage loop 13 in an analogous manner to that used to write the optical data packet into storage loop 13. Refer now to FIG. 3, which illustrates the various signals during the extraction of data packet 31 from storage loop 13. The data packet is extracted as it passes through coupler 14 by opening output optical switch 16.

The data packet is available for extraction each time it passes coupler 14. If the time needed to traverse the storage loop is T, then a data packet introduced at time t=0 will be available at times nT, where n is a positive integer. Hence, as noted above, a cache memory according to the present invention can also be used to provide a digital delay line for altering the relative timing of two optical data packets by storing one of the data packets in an optical cache according to the present invention.

In general, a packet that is read out of cache memory 10 needs to be removed from storage loop 13. As noted above, only a portion of the optical energy stored in storage loop 13 leaves via switch 16. The remainder re-circulates in storage loop 13 and is amplified to make up for the lost signal energy. Hence, a separate method is needed to remove a packet from storage loop 13 once it is no longer needed. In the preferred embodiment of the present invention, an optical switch 21 similar to optical switch 16 is included in storage loop 13. Optical switch 21 is under the control of controller 20; however, to simplify the drawing, the control connections between optical switch 21 and controller 20 have been omitted from the drawing. Optical switch 21 is normally transparent. When a packet is to be extinguished, optical switch 21 is set to an opaque state for the time interval needed to absorb the unwanted packet.

It should be noted that a cache according to the present invention might also be used to implement a broadcast function. As noted above, a packet that is read from storage loop 13 is not eliminated from storage loop 13 by the act of reading the packet. Hence, a packet can be read out at a plurality of different times to different final locations to implement a broadcast switch.

The embodiments of the present invention discussed above have a single input and a single output port. However, embodiments having multiple input and output ports may also be constructed. Multi-port cache memories are particularly useful building blocks for packet switches since the multiple output ports can be connected to different output fibers, thereby allowing packets input on one or more input fibers to be sorted to a different set of output fibers.

Figure 4:
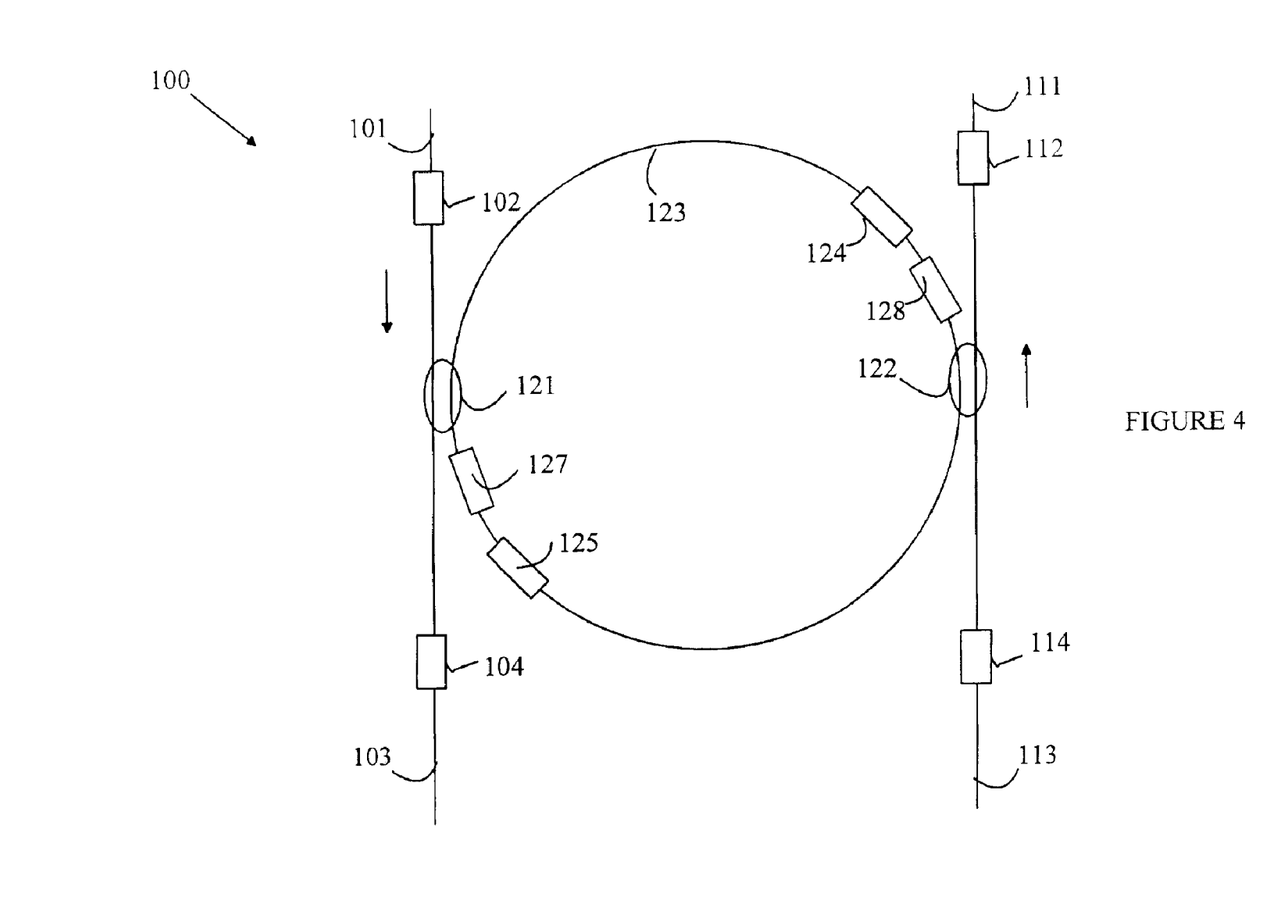
FIG. 4 is a schematic drawing of another embodiment of an optical cache memory according to the present invention.

Refer now to FIG. 4, which is a schematic drawing of an optical cache memory 100 according to another embodiment of the present invention. Optical cache memory 100 has two input ports and two output ports. The input ports include fibers 101 and 113, respectively, which receive the packets to be stored in a storage ring 123. The output ports include fibers 111 and 103, respectively, which receive the outbound packets. Optical cache memory 100 utilizes couplers 121 and 122 to transfer optical signals to and from storage ring 123. The loses incurred at couplers 121 and 122 are made up by semiconductor optical amplifiers 125 and 124, respectively. Signals are gated into storage ring 123 by input optical switches 102 and 114. Similarly, optical signals that leave the storage ring via the couplers are gated to the output fibers by output optical switches 104 and 112.

As noted above, an optical cache memory according to the present invention preferably includes an optical switch in the storage ring for blocking the propagation of packets that are to be dropped from the ring. Optical cache memory 100 preferably utilizes two such optical switches 127 and 128. However, only one optical switch for blocking unwanted packets is needed. The use of one such blocking optical switch per output port has the advantage of allowing a packet that has been output to be erased before it reaches a second coupler in the loop thereby freeing the storage slot for a new packet to be introduced at the second coupler.

The use of multiple output ports also reduces the data latency for a read operation. As noted above, the data latency for a read operation is the time needed for the desired data packet to traverse the portion of the storage loop between the packets current location and the output port through which it is to be read. If the optical cache memory only has one data output port, the maximum data latency is the time to traverse the entire storage loop. In contrast, if N output ports are utilized, this time can be reduced by a factor M, assuming that the packet can be utilized at any output port.

Figure 5:
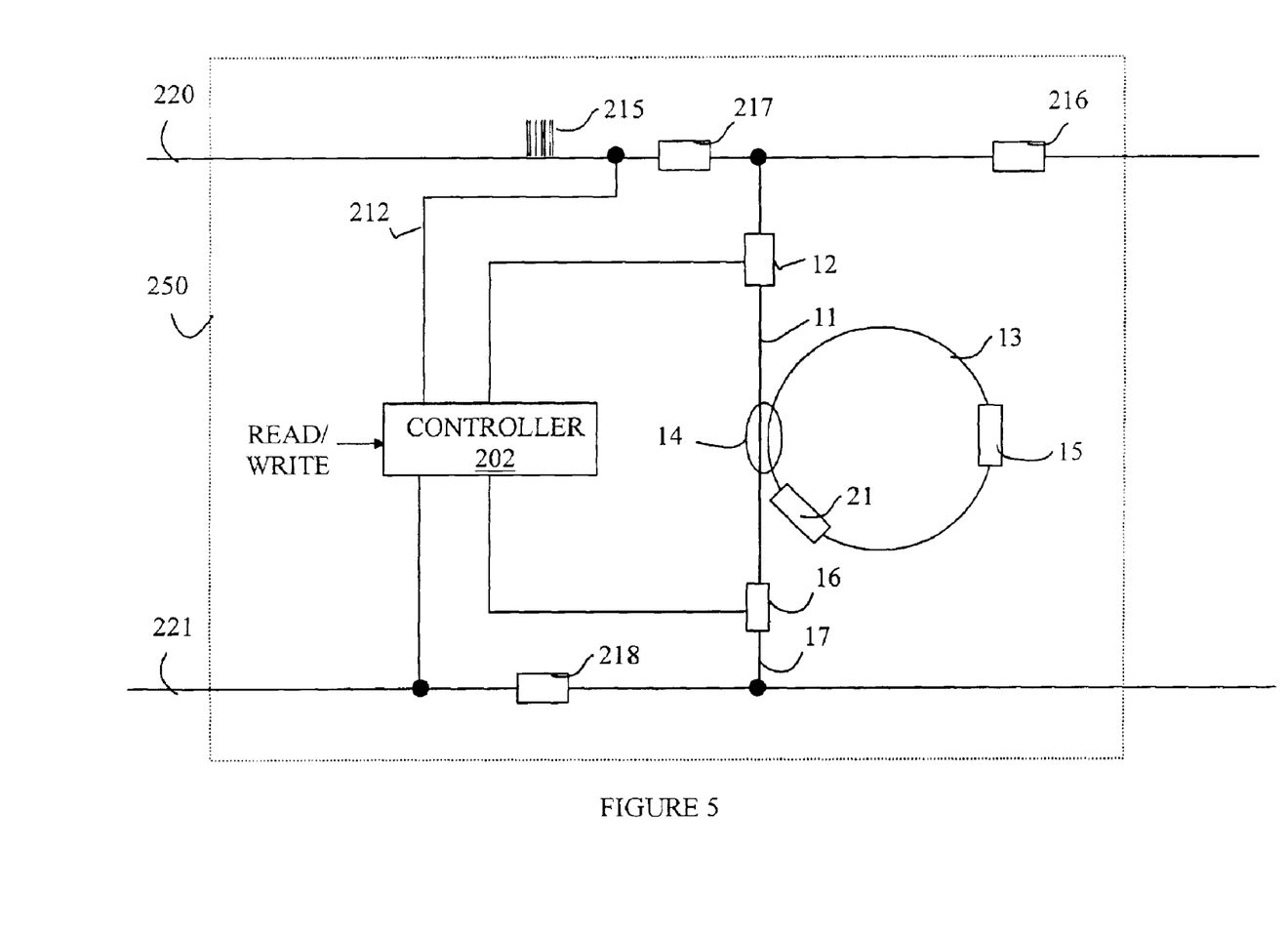
FIG. 5 is a schematic drawing of another embodiment of an optical cache memory according to the present invention.

It should be noted that timing considerations are important in optical systems because of the lack of other forms of optical cache memories. Refer now to FIG. 5, which is a schematic drawing of another embodiment of an optical cache memory according to the present invention. To simplify the following discussion, those elements of optical cache memory 250 that serve the same function as the corresponding elements in optical cache memory 10 shown in FIG. 1 have been given the same numeric designations. Optical cache memory 250 stores data packets 215 that are present on fiber 220 in storage loop 13. For the purposes of this discussion, it will be assumed that controller 202 is programmed such that controller 202 will cause a packet on fiber 220 to be stored if there is a free slot in storage loop 13 that will be available at coupler 14 when packet 215 arrives at coupler 14. In this case, optical cache memory 250 will prevent packet 215 from propagating further down fiber 220 by setting optical switch 216 to block packet 215. If no such slot is available, optical cache memory 250 allows packet 215 to continue down fiber 220 where it will presumably be stored in another cache memory that is connected to fiber 220. To provide sufficient time to set optical switches 12 and 216, a delay line 217 is introduced between the point on fiber 220 that is sampled by controller 202 and switches 12 and 216. In this embodiment of the invention, the input to delay line 217 may be viewed as the input port to optical cache memory 250 and the output of optical switch 216 will be referred to as a by-pass port.

Optical cache memory 250 outputs a data packet in an analogous manner in response to a WRITE control signal indicating which packet stored in storage loop 13 is to be output. The indicated packet will be output onto fiber 221 in the next available slot on fiber 221 that coincides with the packet being available at output switch 16. Controller 202 preferably monitors fiber 221 to determine the presence of an available slot for the packet in question. A delay line 218 for providing a one packet delay is preferably utilized between the sampling point on fiber 221 and the output of optical switch 16. This delay allows controller 202 to determine that a slot of the required length is available on fiber 221.

The read and write operations described above can be performed in response to a specific read or write command being provided to controller 202 or in response to some predetermined algorithm. For example, controller 202 can be programmed to store any packet that is available on fiber 220 that matches a blank slot in storage loop 13. Alternatively, controller 202 can be programmed to only accept such a packet if it is specified in a read command. In one embodiment of the present invention, controller 202 includes circuitry for reading the header bits on the packets and utilizing this information to determine if the packet is to be stored and later read out onto fiber 221.

Similarly, packets stored in storage loop 13 can be read out in response to a specific command or automatically. For example, if optical cache memory 250 is part of a packet switch, controller 202 can be programmed to accept all properly timed packets having a specified bit set in the header of the packet. The header can be read through a fiber 212. A packet would then be read out onto fiber 221 as soon as space for the packet is available. In this scheme, the optical cache memory performs a sorting function for switching packets having specified headers from fiber 220 to fiber 221.

Figure 6:
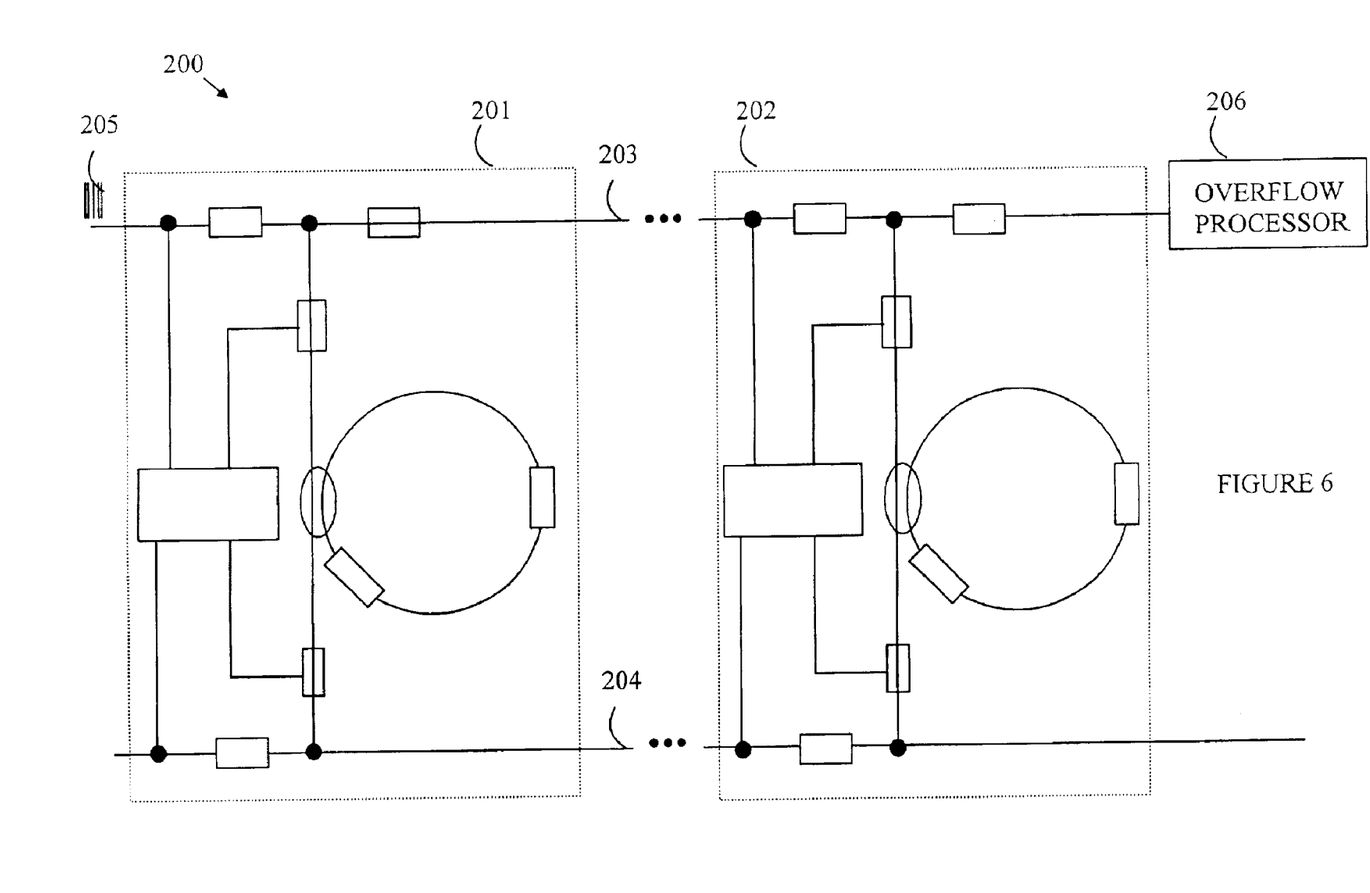
FIG. 6 is a schematic drawing of a plurality of optical cache memories combined to form a dual ported buffer memory.

A plurality of optical cache memories can be combined to form a dual ported buffer memory. Refer now to FIG. 6 which is a schematic drawing of a buffer memory 200 constructed in this manner. Buffer memory 200 is constructed from a plurality of optical cache memories similar to optical cache memory 250 described above. Exemplary optical cache memories are shown at 201–202. The optical cache memories accept optical packets 205 from an input fiber 203 and output the stored packets on output fiber 204.

As each packet approaches an optical cache memory, the optical cache memory determines if there is a slot for that packet in the storage loop in that optical cache memory. If there is a free slot, that optical cache memory diverts the packet into its storage loop. If not, the packet proceeds to the next optical cache memory on the input optical fiber and the process is repeated until the optical packet is finally stored in one of the optical cache memories.

If sufficient optical cache memories are provided in the packet switch, each packet will eventually be stored in a storage loop on one of the optical cache memories. If there are not sufficient optical cache memories, some of the packets will reach the end of the input fiber without finding a storage loop. The number of such packets will be considerably smaller than the number of packets arriving at the input to buffer memory 200. Accordingly, an electrically based overflow processor 206 can be provided to temporarily store these remaining packets by converting the optical packets to electrical signals and storing the electrical signals.

Stored packets are output on optical fiber 204 as space is available on that optical fiber or in response to a specific output command sent to the controllers in the optical cache memories. For example, buffer memory 200 can be operated as a FIFO buffer by outputting the packets in the order in which the packets were stored. In this case, the various controllers keep track of the time at which a packet was placed in the storage loop associated with that controller. Each controller also transmits that information to the other controllers such that the controller with the oldest packet will be given priority to output that packet on output fiber 204 in the next slot that becomes available after a readout command is received by buffer memory 200.

The control functions associated with buffer memory 200 can be distributed between the various controllers in the optical cache memories or may be centralized in a single controller. In addition, systems in which both a centralized controller and local controllers share the control functions can be constructed. To simplify the drawing, only the local controllers are shown in the drawing.

The above-described embodiments of the present invention assume that the optical signals stored in the storage loops remain uncorrupted by noise during the time the signals are stored in the storage loops. However, if the signals remain in the storage loops for a sufficiently long period of time, sufficient noise will accumulate to corrupt the signals. For example, the semiconductor optical amplifiers will introduce some noise into the signals on each passage of a signal through the amplifier. Accordingly, some form of signal reconditioning may be advantageous in some embodiments of the present invention.

To recondition a signal, the optical signal is preferably sent through a processor that compares the signal to a predetermined threshold and sets the signal to zero if the signal is less than that threshold and to an amplitude corresponding to a logical one if the signal is greater than that threshold. Such circuits are well known in the digital electronic arts; however, an economical optical equivalent circuit is not known. Accordingly, the present invention preferably converts an optical signal to be reconditioned to an electrical signal and then performs the reconditioning on the electrical signal. The reconditioned electrical signal is then converted back into an optical signal. Such reconditioning circuitry is known to the art, and hence, will not be discussed in detail here.

Figure 7:
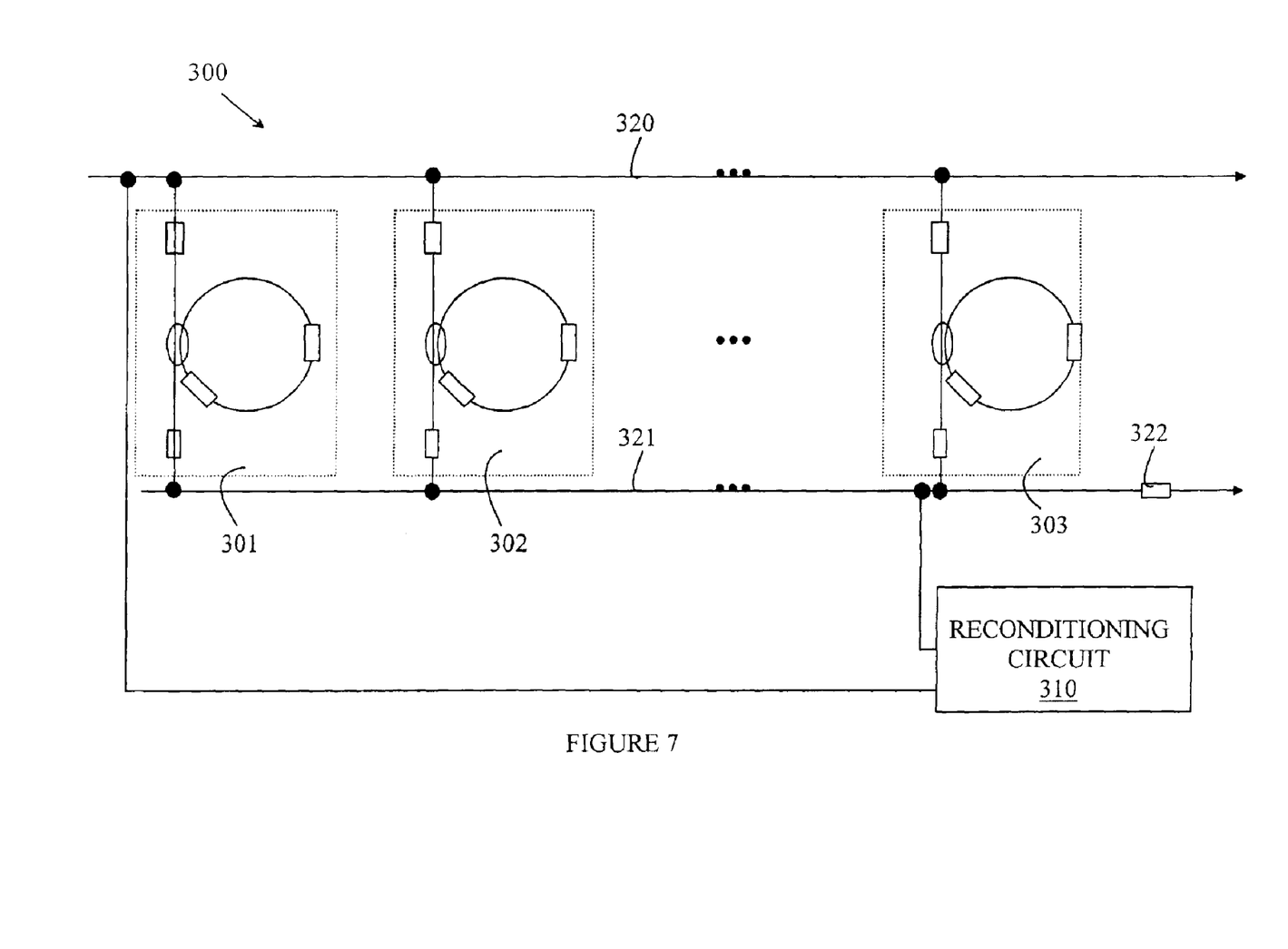
FIG. 7 illustrates an exemplary embodiment of a buffer memory 300 having a reconditioning circuit.

As noted above, electrically based circuitry that must operate at the frequencies used to modulate optical signals is quite expensive. Hence, the present invention preferably utilizes an arrangement in which a number of optical cache memories according to the present invention share a single reconditioning circuit, thereby reducing the effective cost per optical cache memory. Refer now to FIG. 7, which illustrates an exemplary embodiment of a buffer memory 300 having a reconditioning circuit. Buffer memory 300 is constructed from a plurality of optical cache memories that operate in a manner similar to that described above. Exemplary memories are shown at 301–303. Optical cache memories 301–303 are preferably the same as optical cache memory 250 shown in FIG. 5. To simplify the drawing, only the components involved in the reconditioning operation are shown. In addition, the switches that correspond to switches 216–218 shown in FIG. 5 have also been omitted from the drawing together with the controllers.

The optical cache memories store data packets presented on an input optical fiber 320 and output data packets onto an output optical fiber 321. When the data in one of the optical cache memories requires reconditioning, that optical cache memory outputs its data to reconditioning circuit 310. The reconditioned data is then presented as input data on optical fiber 320. A switch 322 prevents the data that is being reconditioned from exiting from the buffer memory during the reconditioning operation.

The above-described embodiments of the present invention have utilized optical fibers as the transmission medium for the optical signals. However, other suitable forms of waveguide can be employed without departing from the teachings of the present invention.

The above-described embodiments of the present invention have utilized specific types of optical switches and amplifiers. However, it is to be understood that other types of optical switches and amplifiers may be utilized.

Various modifications to the present invention will become apparent to those skilled in the art from the foregoing description and accompanying drawings. Accordingly, the present invention is to be limited solely by the scope of the following claims.

What is claimed is:

1. An optical memory comprising:
   an input port for receiving an input optical signal;
   a storage loop for storing a plurality of optical signals;
   a coupler for transferring a first portion of said input optical signal to said storage loop;
   an output switch for coupling a second portion of one of said optical signals stored in said storage loop to a first external optical waveguide while leaving a third portion of that optical signal in said storage loop; and
   a semiconductor optical amplifier for amplifying said optical signals stored in said storage loop.

2. The optical memory of claim 1 wherein said input port comprises an input optical switch separate from said coupler for connecting and disconnecting said storage loop from a second external optical waveguide.

3. The optical memory of claim 1 wherein said storage loop further comprises an optical switch for selectively blocking one of said optical signals stored in said storage loop from propagating in said storage loop.

4. The optical memory of claim 1 further comprising a controller for operating said output optical switch.

5. An optical memory comprising:
   an input port for receiving an input optical signal;
   a storage loop for storing optical signals;
   a coupler for transferring a first portion of said input optical signal to said storage loop;

an output switch for coupling a second portion of one of said optical signals stored in said storage loop to a first external optical waveguide; a a semiconductor optical amplifier for amplifying said optical signals stored in said storage loop; and a controller for operating said output optical switch, wherein said controller further comprises a decoder for reading optical signals stored in said optical storage loop.

6. An optical memory comprising:

an input optical fiber for receiving optical data packets to be stored in said optical memory;

an output optical fiber for reading out optical data packets stored in said optical memory;

a plurality of cache optical memories, each cache optical memory comprising:

an input port connected to said input optical fiber for selectively receiving one of said optical data packets on said input optical fiber, a storage loop for storing optical data packets;

a coupler for transferring a first portion of said one of said optical data packets to said storage loop;

an output switch for coupling a second portion of one of said optical data packets stored in said storage loop to said output optical fiber, while leaving a third portion of that optical packet in said storage loop; and a semiconductor optical amplifier for amplifying said optical data packets stored in said storage loop.

7. An optical memory comprising:

an input optical fiber for receiving optical data packets to be stored in said optical memory;

an output optical fiber for reading out optical data packets stored in said optical memory;

a plurality of cache optical memories, each cache optical memory comprising:

an input port connected to said input optical fiber for selectively receiving one of said optical data packets on said input optical fiber;

a storage loop for storing optical data packets;

a coupler for transferring a first portion of said one of said optical data packets to said storage loop;

an output switch for coupling a second portion of one of said optical data packets stored in said storage loop to said output optical fiber;

a semiconductor optical amplifier for amplifying said optical data packets stored in said storage loop; and a controller for monitoring said input optical fiber for an optical packet to be stored in said optical memory and for causing one of said cache memories to store said optical packet if that cache memory has space in said storage loop contained in said cache memory for that optical packet.

8. The optical memory of claim 7 wherein said controller causes one of said cache optical memories to couple a third portion of one of said optical packets stored in that cache optical memory to said output optical fiber.

9. The optical memory of claim 8 wherein said controller monitors said output optical fiber to determine if said output optical fiber has space for said one of said optical packets.

10. An optical memory comprising:

an input optical fiber for receiving optical data packets to be stored in said optical memory;

an output optical fiber for reading out optical data packets stored in said optical memory;

a plurality of cache optical memories, each cache optical memory comprising:

an input port connected to said input optical fiber for selectively receiving one of said optical data packets on said input optical fiber;

a storage loop for storing optical data packets;

a coupler for transferring a first portion of said one of said optical data packets to said storage loop;

an output switch for coupling a second portion of one of said optical data packets stored in said storage loop to said output optical fiber;

a semiconductor optical amplifier for amplifying said optical data packets stored in said storage loop; and a reconditioning circuit for reacting optical packets from said output fiber, said optical packets comprising a plurality of optical signals characterized by an optical signal amplitude, said reconditioning circuit causing the optical signal amplitude of said optical signals to be set to a first value if said optical signal amplitude is greater than, or equal to, a threshold value and to a second value if said optical signal amplitude is less than said threshold value.

11. A method for storing an optical signal, said method comprising causing a first portion of said optical signal to be stored in an optical storage loop;

amplifying said first portion of said optical signal stored in said optical storage loop to compensate for losses in said optical storage loop; and causing a second portion of said optical signal to be transferred to an output optical waveguide, while leaving a third portion of that optical packet in said storage loop.

12. The method of claim 11 further comprising the elimination of said first portion of said optical signal from said optical storage loop after said second portion of said optical signal has been transferred to said output optical fiber.

13. The method of claim 11 wherein said first portion of said optical signal is amplified by a semiconductor optical amplifier.

14. The method of claim 11 wherein said output optical waveguide comprises an optical fiber.

15. The method of claim 11 wherein a controller determines if there is space in said optical storage loop prior to causing said first portion of said optical signal to be stored in said optical storage loop.

* * * * *

UNITED STATES PATENT AND TRADEMARK OFFICE
CERTIFICATE OF CORRECTION

PATENT NO. : 6,917,739 B2
DATED : July 12, 2005
INVENTOR(S) : Chen

It is certified that error appears in the above-identified patent and that said Letters Patent is hereby corrected as shown below:

Title page,
Item [56], References Cited, OTHER PUBLICATIONS,
"Langenhorst" reference, delete "Jounral" and insert -- Journal --, therefor.
"Jacob" reference, delete "SHifting" and insert -- Shifting --, therefor.

Column 9,
Line 3, after "waveguide;" delete "a".

Signed and Sealed this

Sixth Day of December, 2005

JON W. DUDAS
*Director of the United States Patent and Trademark Office*